(12) United States Patent
Gearhart et al.

(10) Patent No.: US 6,946,194 B2
(45) Date of Patent: Sep. 20, 2005

(54) METHOD AND SYSTEM FOR DETERMINING WEATHER STRIP FIT FOR A CLOSURE PANEL OF A VEHICLE

(75) Inventors: Chris Conway Gearhart, Chelsea, MI (US); Sankaran Subramaniam, Canton, MI (US); Vijitha Senaka Kiridena, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 164 days.

(21) Appl. No.: 10/666,714

(22) Filed: Sep. 18, 2003

(65) Prior Publication Data

US 2005/0074604 A1 Apr. 7, 2005

Related U.S. Application Data

(62) Division of application No. 10/064,130, filed on Jun. 13, 2002, now Pat. No. 6,860,067.

(51) Int. Cl.[7] .............................. C09J 7/02; B60J 10/08; B60J 10/02
(52) U.S. Cl. ......................... 428/354; 428/343; 49/502; 49/475.1; 296/93; 427/208
(58) Field of Search ................................. 428/354, 343; 49/502, 475.1; 296/93; 427/208

(56) References Cited

U.S. PATENT DOCUMENTS

| 4,447,485 A | * | 5/1984 | Aritake ........................ 428/144 |
| 5,141,790 A | * | 8/1992 | Calhoun et al. ............ 428/40.4 |
| 5,240,761 A | * | 8/1993 | Calhoun et al. ............ 428/148 |
| 5,527,583 A | | 6/1996 | Nozaki et al. ................ 428/99 |
| 2001/0054261 A1 | | 12/2001 | Nozaki et al. ............. 49/498.1 |

FOREIGN PATENT DOCUMENTS

| EP | 0-822-109 A1 | 6/1997 |
| GB | 2-272-299 A | 9/1990 |

* cited by examiner

*Primary Examiner*—Daniel Zirker
(74) *Attorney, Agent, or Firm*—Raymond L. Coppiellie; Dykema Gossett PLLC

(57) ABSTRACT

A method and system for determining weather strip fit for the closure panels of a vehicle includes a flexible carrier with a transferable disclosing agent disposed on the flexible carrier. The flexible carriers may be applied to a closure panel of vehicle when the panel is in an open position, with the panel then being closed so as to allow the disclosing agent to either be transferred to the fixed side of the opening, or to be merely dislodged from the flexible carrier. In either case, the pattern of interference fit between the weather strip and the closure panel is then disclosed.

3 Claims, 5 Drawing Sheets

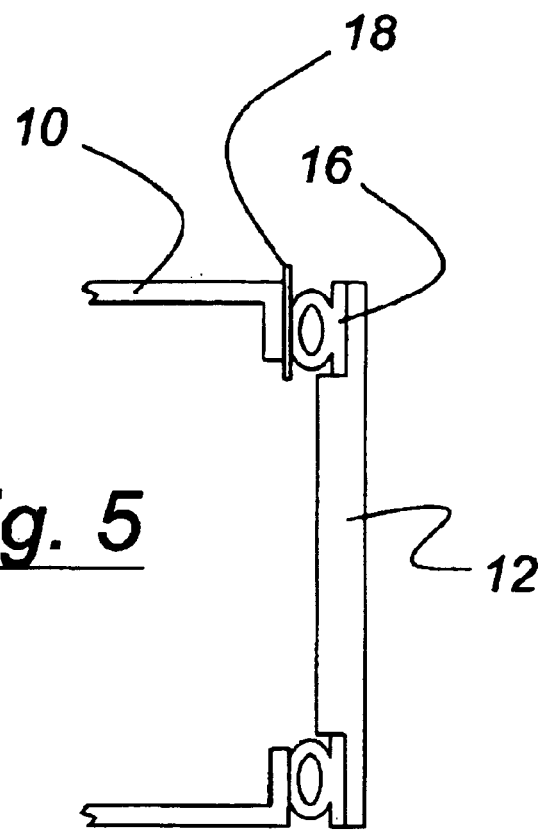
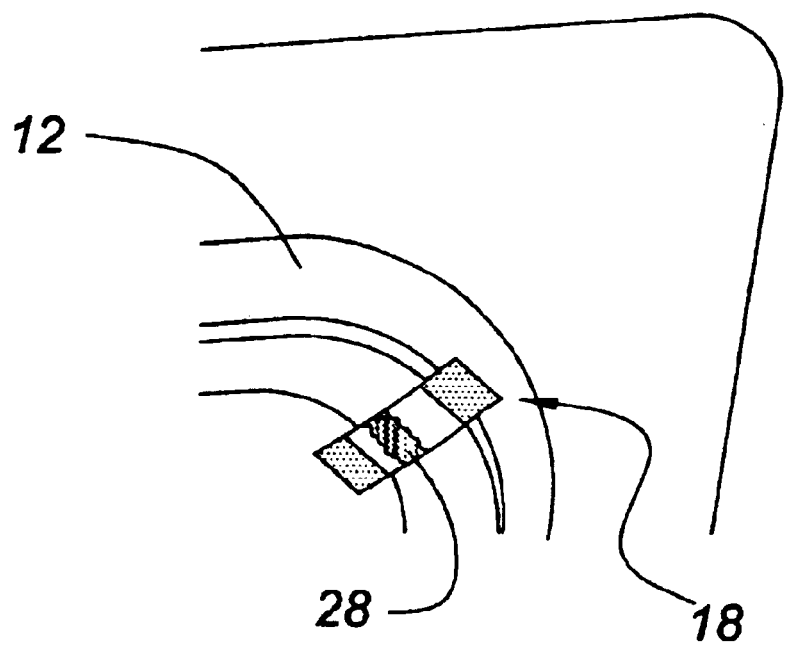

METHOD AND SYSTEM FOR DETERMINING WEATHER STRIP FIT FOR A CLOSURE PANEL OF A VEHICLE

This application is a Division of U.S. application Ser. No. 10/064,130 filed on Jun. 13, 2002 now U.S. Pat. No. 6,860,067.

BACKGROUND OF INVENTION

1. Field of the Invention

The present invention relates to a method and system for determining interference fit of a weather strip interposed between movable and immovable closure panels of vehicle so as to enable adjustments intended to minimize air and water leaks between the panels and their corresponding mating surfaces.

2. Disclosure Information

Wind noise around the doors and windows of motor vehicles is a frequent source of dissatisfaction for motorists. Wind noise arises from air passing through the door and weather strip interfaces. Motion of the vehicle creates a pressure differential between the vehicle interior and exterior which increases as the vehicle reaches higher speed. This pressure differential causes a flow of air through the interfaces between the closure panels and the weather strips or seals. This leakage is generally referred to as an "aspiration leak". FIG. 1 is a stylized representation of a body structure, 10, having a movable closure panels 12 and first plurality of weather strip seals 14 and a second plurality of weather strip seals 16. Weather strips 14 of FIG. 1 leak because closure panel 12 does not compress seal 14 sufficiently so as to prevent a leakage path between body 10 and seal 14. On the other hand, closure panel 13 compresses seal 16 sufficiently to create an interference fit between seal 16 and body 10. As a result, no aspiration leak will exist between closure panel 13 and body 10, or more precisely, between seal 16 and body 10.

The purpose of the present invention is to provide a method and measurement system to identify and quantify correct fit of weather strips, which is achieved when there is interference between the weather strip and the panel or body surface to which it is sealing. In essence, the present invention provides a "interference indicator tape" (IIT) which can be used to reduce interference variability of dynamic seals such as weather strips on the doors of vehicles as well as other movable closure panels such as moon roofs and deck lid and engine compartment hoods. IIT may also be used to reduce wind and water leaks and to fit closure panels such as windshields and backlites.

Automotive designers and engineers have used a variety of tests to determine the presence and source of weather strip leaks. Once such test is called the chalk test. This involves spraying chalk from an aerosol can onto a vehicle weather strip. Then the door is closed and opened and presence of transferred chalk is noted. Unfortunately the chalk test is unreliable because the amount of chalk transferred from the weather strip to the door depends to a very great extent on the normal force developed between the weather strip and the vehicle body or door. Also, the sprayed chalk flies everywhere and is extremely difficult to remove from the vehicle. This type of test is therefore not appropriate for customer vehicles or vehicles being produced in assembly plants.

A second type of prior art test involves a thin film which when trapped between the weather strip and the closure panel changes color in relation to the pressure being applied. Unfortunately, such films do not work at the low normal pressures generally needed to properly engineer and provide automotive weather strips.

As might be imagined, electronic pressure measuring devices such as thin film tactile pressure sensors may be used to determine the normal force between a weather strip and a vehicle closure panel or body. Unfortunately, such systems are plagued with low resolution, very great expense, extraordinary time demands upon the human operator, and difficulties in reproducing the study results because of the need to precisely determine locations where measurements are taken.

Other type of tests for weather strips include air leakage testing which, although allowing measurement of the gross amount of air escaping from a passenger cabin, cannot pinpoint the location of an air leak. Although ultrasonic testing may be used to prevent severe weather strip leaking from occurring, it is very difficult to relate the ultrasonic result to the severity of the weather strip gaps, if any. Finally, sealing gaps are often measured in a vehicle body before the installation of weather strips. However, such gaps do not typically correlate well with the weather strip gaps experienced on vehicles. This lack of correlation may arise from the inability to precisely predict the free standing height and characteristic of seals. Electronic sound measurement devices are also used to analyze wind noise. However, such devices cannot locate the source of the wind noise with the precision needed to adjust the seal interference to achieve a desired reduction wind noise.

A method and system according to present invention solves the problems associated with prior art seal interference and leakage path detection systems, at a low cost and without the need for more than minimal training of personnel employing the present system and method.

SUMMARY OF INVENTION

A method for determining the fit of a weather strip for sealing a closure panel of a vehicle includes the steps of attaching at least one flexible carrier having a transferable disclosing agent disposed thereupon, to a portion of the closure panel which normally contacts the weather strip when the closure panel is in a closed position, and then closing the closure panel to allow transfer or removal of a portion of the disclosing agent from the carrier. Thereafter, the closure panel is opened and the pattern of the disclosure agent removed from the flexible carrier due to the interaction of the closure panel and flexible carrier with weather strip is read, so as to identify whether an interference fit is present between the weather strip and closure panel. The weather strip is preferably positioned between the closure panel and a body comprising a portion of the vehicle. The closure panel itself may comprise a passenger door, windshield, backlite, or another component which is mounted to a vehicle. If desired, a plurality of flexible carriers having disclosing agent disposed on each of the carriers may be applied to the closure panel so as to get an accurate picture of the total weather strip sealing of the closure panel.

According to another aspect of the present invention, a disclosing agent may comprise a material which is, for example, sprayed onto the flexible carrier. This material may present itself as a frangible coating, and as such as it may be resistant to blow away, but nevertheless subject to removal by crushing or rubbing when the closure panel, such as a door, is closed upon a weather strip seal.

According to another aspect of the present invention, a flexible carrier may comprise a tape having an adhesive for securing the flexible carrier to a closure panel.

According to another aspect of the present invention, a system for determining the fit between a closure panel and a weather strip attached to a body of a vehicle includes a flexible carrier, a transferable disclosing agent disposed upon a first surface of a flexible carrier, and an attachment agent disposed upon a second surface of the flexible carrier, so as to permit the flexible carrier to be removably positioned between a portion of the closure panel and a portion of the weather strip, which portions are normally in contact when the closure panel is in a closed position. This allows the disclosing agent to be transferred from the flexible carrier to a portion of the weather strip which is in contact with the closure panel. In essence, the flexible carrier carries a pressure sensitive disclosing agent so the agent may be transferred to a portion of the weather strip or to a vehicle body, so as to disclose the interference fit, if any, of the weather strip. Alternatively, the disclosing agent may be merely removed or brushed off by the action of the weather strip, or pushed off or knocked from the flexible carrier, so as to disclose the interference between the closure panel and the weather strip or other seal.

According to yet another aspect of the present invention, an apparatus for preparing an interference indicating system with a flexible carrier having a disclosing agent disposed thereon, includes roll mounted flexible carrier stock having first and second surfaces, with the first surface coated with a pressure-sensitive adhesive. A spray nozzle equipped with a fluid supply mechanism furnishes disclosing agent to the spray nozzle. Finally, a feeder draws flexible carrier stock from the roll and past the spray nozzle so as to permit the nozzle to deposit disclosing agent upon the second surface of the flexible carrier.

It is an advantage of the present invention that a system and method according to this invention provides a straight-forward system for determining the adequacy of sealing of a closure panel.

Another advantage of the present invention resides in the fact that the present system and method provides visual feedback to the user of the adequacy, or inadequacy, of a sealing system.

It is another advantage of the present invention that the present method and system provide a repeatable and reproducible measurement procedure for quantifying interference gap between two relatively movable panels of a vehicle.

It is another advantage of the present invention that testing according to this method maybe completed in a few minutes so as to allow a great number of vehicles to be tested in a brief period of time.

It is another advantage of the present invention that this system may be implemented at low cost.

It is another advantage of the present invention that the present method and system may be employed by personnel having minimal training.

It is another advantage of the present invention that the present system does not soil a vehicle when it is employed.

Other advantages, as well as objects and features of the present invention will become apparent to the reader of this specification.

BRIEF DESCRIPTION OF DRAWINGS

FIG. 5 is a schematic illustration showing the positioning of a flexible carrier according to present invention between a vehicle body and a weather strip, and shows the door as closed against the weather strip so as to allow the disclosing agent to be transferred from the IIT to a portion from the weather strip which is in contact with the vehicle body.

FIG. 6 illustrates a contact region between a weather strip and the door of FIG. 4, as indicated upon the IIT.

DETAILED DESCRIPTION

As used herein, the term "weather strip" is intended to mean a class of resilient sealing materials commonly used, for example, in automotive bodies. Such sealing materials may have tubular, or flat or flanged, or solid trapezoidal shapes, and dozens of other shapes as well. The present invention offers a method and system for determining whether such seals adequately contact the closure panels and body openings to which they are applied.

Figure 1:
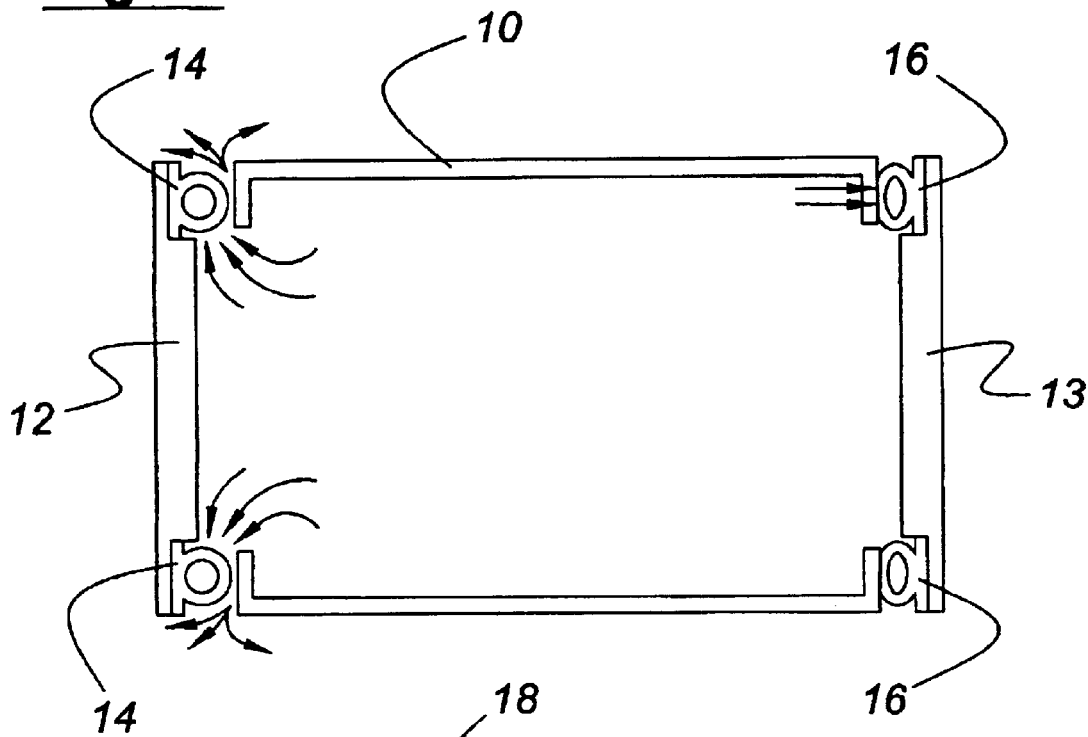
FIG. 1 is a schematic representation of a weather strip seal system and closure system illustrating the source of aspiration leaks between seals and closure panels in the vehicle.
Figure 2:
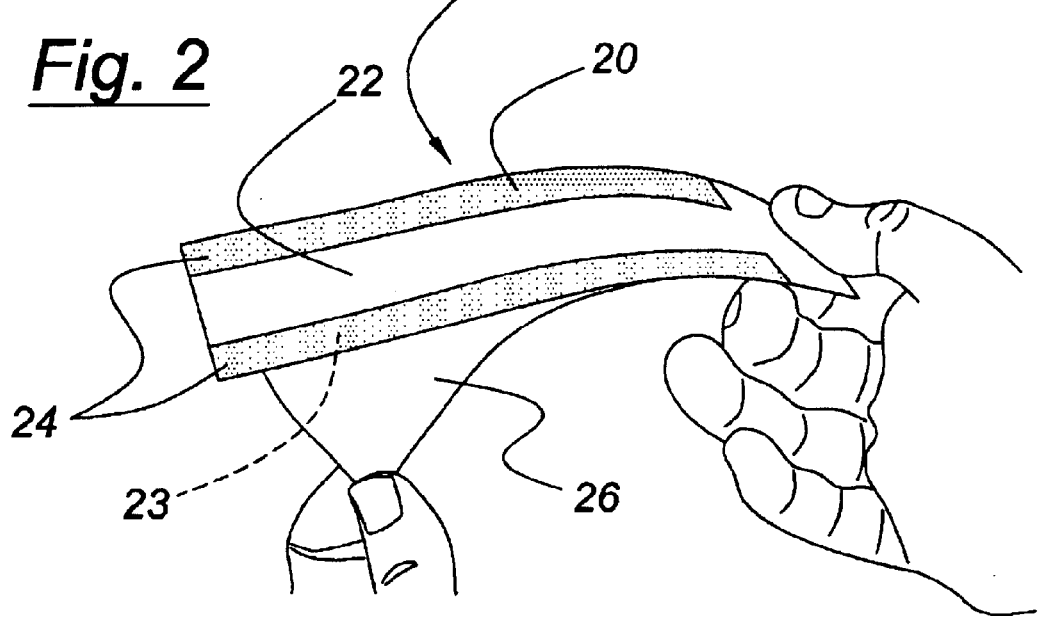
FIG. 2 is a perspective view of an interference indicator tape according to the present invention, prior to being cut into separate strips.

A system for determining the fit between a closure panel and a weather strip attached to the body of a vehicle according to the present invention may be prepared as a series of conjoined flexible carriers 18 as shown in FIG. 2. In essence, FIG. 2 illustrates a number of flexible carriers 18 which are yet to be cut into individual IIT strips shown in FIG. 3. Concentrating for the moment on FIG. 2, it is seen that the system includes tape 20 having an adhesive backing 23. The adhesive backing 23 allows flexible carrier 18 to be adhered to a closure panel or weather strip according to the present invention. A transferable disclosing agent 22 is applied to the non-sticking side of tape 20. The disclosing agent preferably comprises a fragile coating which is sprayed onto flexible carrier 18 or another frangible coating which is deposited onto the flexible carrier 18. The inventors of the present invention have determined that Magnaflux® Spotchek® SKD-S2® developer powder provides a useful disclosing agent for practicing the present invention at an installed depth of 0.05–0.15 mm. Moreover, 3M® Scotch Brand® sealing tape stock no. 3750-P, in a 2" width, comprising polypropylene having a thickness of about 0.1 mm and a synthetic rubber adhesive is also appropriate for practicing the present invention. A nonstick backing 26 is applied to the sticky or adhesive side of tape 20 during preparation of flexible carrier, so as to provide temporary stiffening of tape 20. Paper tabs 24 are also adhered to the sticky or bottom side of tape 20, to permit easier handling of tape 20. Those skilled in the art will appreciate in view of this disclosure that other types of disclosing agents may be employed with a system and method according to the present invention. A principal need in this regard is that the disclosing agent readily transfer from the flexible carrier to the mating surface when the closure panel is moved into its closed position, without separating from the IIT in advance of its intended use. In other words, the disclosing agent serves as a pressure sensitive coating which transfers from the carrier to the mating surface, whether it be a weather strip, or other structure, when the closure panel is moved to a closed position.

Figure 3:
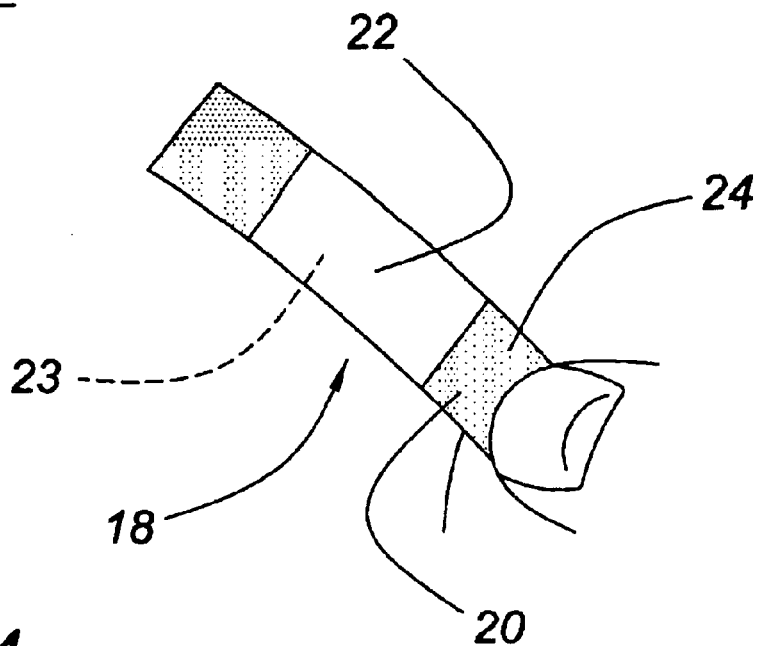
FIG. 3 is a prospective view of an interference indicator tape according to the present invention prepared for application to a vehicle.

As shown in FIG. 3, flexible carrier 18 as prepared for use as an IIT, may comprise a strip of approximately ½" in width and about 2" in length. All that need be done to apply flexible carrier 18 is to remove nonstick backing 26 from tape 20. It is easily seen that the present method is economical because large amounts of materials and time are not needed to practice this invention, particularly in the preparation phase.

Figure 4:
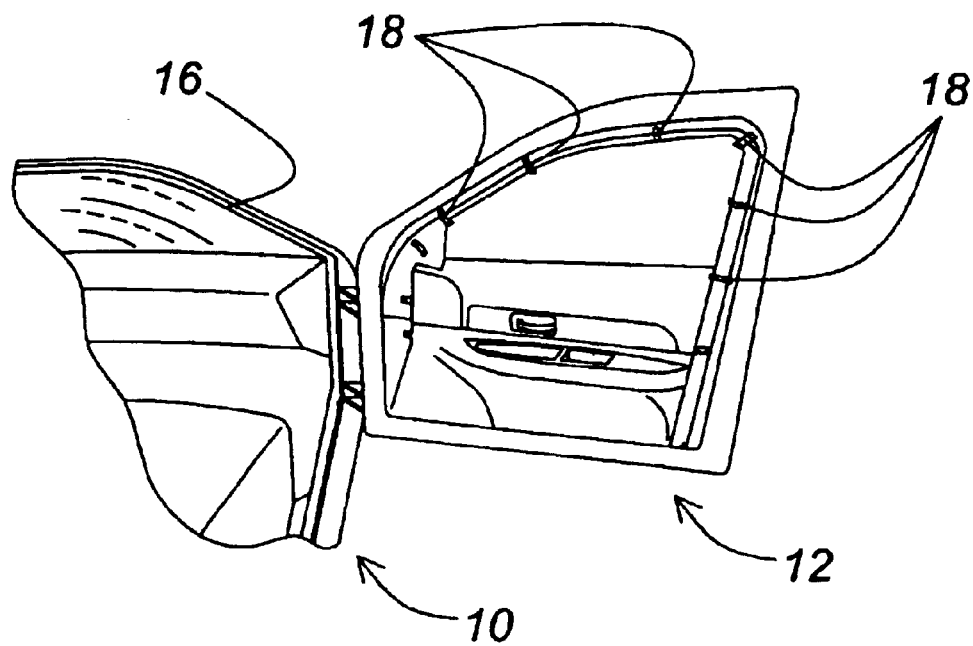
FIG. 4 illustrates a plurality of IIT units applied to a door of a vehicle according to the present invention.

FIG. 4 illustrates a closure panel, in this case automotive door 12, having a plurality of IIT strips 18 attached thereto. Door 12 is then closed into contact with weather strip 16 carried on auto body 10. The closed door, body and weather strip are represented in FIG. 5, wherein IIT 18 is interposed between weather strip 16 and body 10, with door 12 providing a normal force against weather strip 16 so as to cause transfer of the disclosing agent from IIT 18 to weather strip 16.

Those skilled in the art will appreciate in view of this disclosure that a system and method according to the present invention could be employed with closure structures of varying types. For example, the seal or other weather strip could be applied to either a movable closure panel or to the mating surface of the body of a vehicle. Moreover, the individual IIT carriers could be applied to either the weather strip or to the panel which opposes the weather strip when the closure is made, regardless of whether the weather strip is attached to the door or the body of the vehicle. For example, FIG. 4 shows an arrangement in which the weather strip or seals are attached to body 10 of a vehicle and flexible carriers 18 are attached to door 12 such that disclosing agent 22 is removed from flexible carriers 18 in the regions in which weather strip 16 contacts door 12. This result is shown in FIG. 6 wherein contact region 28 on IIT 18 (a region in which disclosing agent 22 has been removed from carrier portion of IIT 18) shows the precise location of the interference between closure 12 and the facing weather strip or seal 16.

Figure 8:
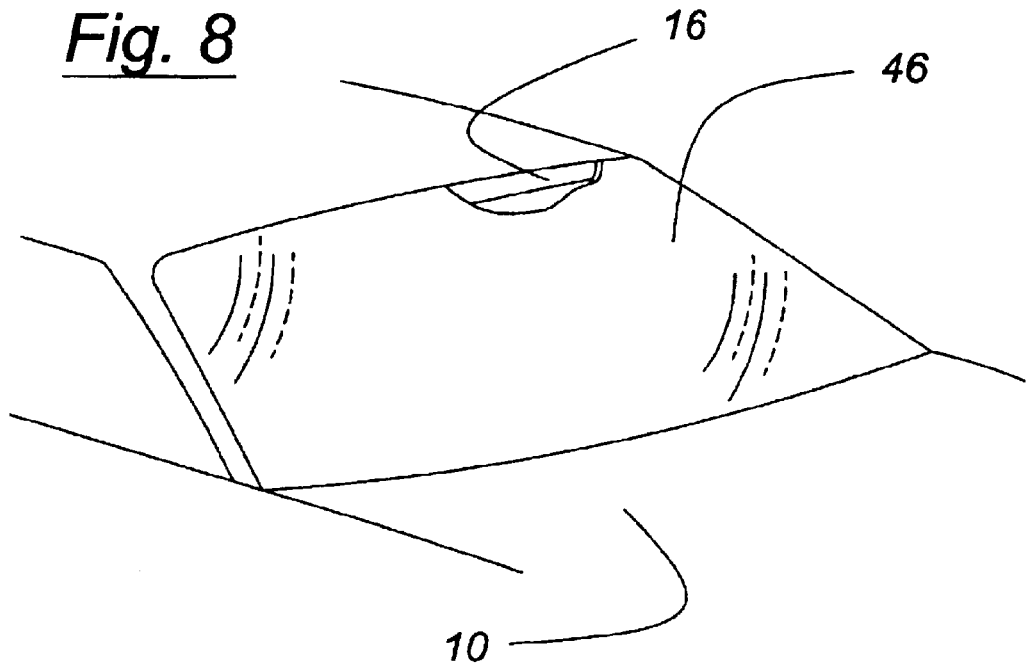
FIG. 8 illustrates use of a system and method according to the present invention to assess the interference fit of a weather strip with a vision unit such as a windshield or backlite.

FIG. 8 illustrates vision unit 46 applied to body 10 of a vehicle. As used herein, the term vision unit applies to either a windshield, or a backlite, or other type of glazing which is fixed in place. With the construction of FIG. 8, the fit of the weather strip may be assessed by applying a plurality of flexible carriers 18 to vision unit 46 and then placing vision unit down on weather strip 16, which is interposed between the vehicle body and vision unit 46. Patterns similar to that shown in FIG. 6 will result, and the interference between weather strip 16 and vision unit 46 will be readable. The interference pattern illustrated in FIG. 6 may be measured with a scale or other measuring instruments, and the measurements recorded, so as to provide an objective indication of weather strip engagement.

Figure 7:
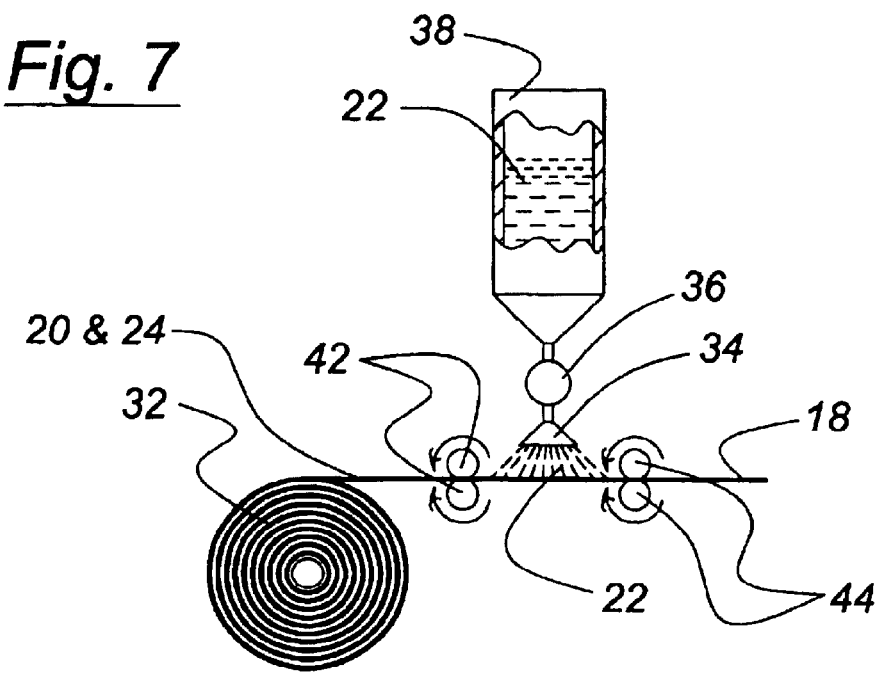
FIG. 7 illustrates an apparatus for preparing a flexible carrier having a transferable disclosing agent disposed thereupon according to the present invention.

FIG. 7 illustrates an apparatus for producing a flexible carrier equipped with disclosing agent according to the present invention. Thus, material from roll 32, which includes tape 20, paper tabs 24, and nonstick backing 26, is pulled through pinch rollers 42 by drive rollers 44. As tape 20, including tabs 24 and backing 26, is fed between pinch rollers 42 and drive rollers 44, disclosing agent 22 is sprayed upon the non-sticky side of tape 20, by means of nozzle 34, which is supplied with disclosing agent 22 by pump 36 from reservoir 38. In this manner, completely prepared IIT 18 maybe obtained without the need for manual spraying and with much more consistent results in terms of the disposition of disclosing agent 22 on tape 20.

Figure 9:
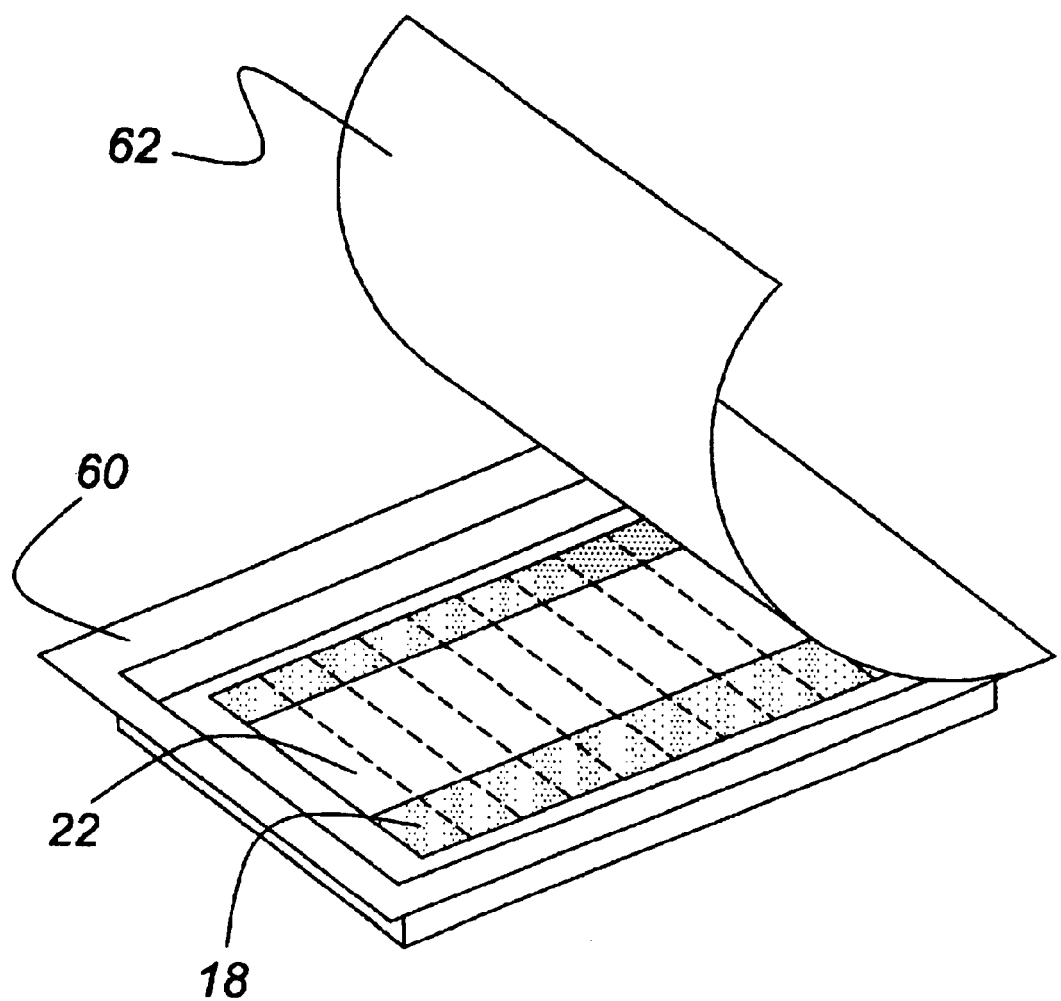
FIG. 9 illustrates a packaging system for containing prepared IIT according to the present invention.

FIG. 9 illustrates packaging for completely assembled IIT carriers 18, including previously deposited disclosing agent 22. Container 60, preferably molded of plastics, has peel-off lid 62. Container 60 allows the unused IIT carriers to be transported without spoilage—a capability which is important to field use of the present inventive system and method.

Although the present invention has been described in connection with particular embodiments thereof, it is to be understood that various modifications, alterations and adaptations may be made by those skilled in the art without departing from the spirit and scope of the invention. For example the flexible carriers may be positioned either upon a weather strip, or upon a closure panel coming in contact with the weather strip when the panel is closed. And the present invention may be used as a system for determining the fit between first and second machine parts having a first mating surface integral with said first machine part and a second mating surface integral with said second machine part, where the flexible carrier of the IIT is removably positioned upon the first mating surface, so as to allow a portion of the disclosing agent to be removed from the flexible carrier and transferred to the second mating surface when the first mating surface is contacted with a portion of the second mating surface.

It is intended that the invention be limited only by the appended claims.

What is claimed is:

1. A system for determining the fit between a closure panel and a weather strip attached to a body of a vehicle, comprising:

a flexible carrier;

a disclosing agent disposed upon a first surface of the flexible carrier; and an attachment agent, disposed upon a second surface of the flexible carrier, thereby permitting the flexible carrier to be removably positioned between a portion of said weather strip and a portion of the closure panel which are normally in contact when the closure panel is in a closed position, so as to allow a portion of the disclosing agent to be displaced from the flexible carrier when the closure panel is contacted with the weather strip.

2. A system for determining the fit between a closure panel and a weather strip attached to a body of a vehicle according to claim 1, wherein the disclosing agent which is displaced from the flexible carrier is transferred from the flexible carrier to a portion of the weather strip which is in contact with the closure panel when the closure panel is in a closed position.

3. A system for determining the fit between first and second machine parts having a first mating surface integral with said first machine part and a second mating surface integral with said second machine part, with said system comprising:

a flexible carrier;

a disclosing agent disposed upon a first surface of the flexible carrier; and an attachment agent, disposed upon a second surface of the flexible carrier, thereby permitting the flexible carrier to be removably positioned upon the first mating surface, so as to allow a portion of the disclosing agent to be removed from the flexible carrier and transferred to the second mating surface when the first mating surface is contacted with a portion of the second mating surface.

* * * * *